United States Patent
Werner et al.

(10) Patent No.: US 11,551,725 B2
(45) Date of Patent: Jan. 10, 2023

(54) METHOD AND SYSTEM FOR RECORDING AND SYNCHRONIZING AUDIO AND VIDEO SIGNALS AND AUDIO AND VIDEO RECORDING AND SYNCHRONIZATION SYSTEM

(71) Applicant: Sennheiser electronic GmbH & Co. KG, Wedemark (DE)

(72) Inventors: Norbert Werner, Hannover (DE); Axel Schmidt, Wedemark (DE); Konstantin Septinus, Hamburg (DE); Björn Wolter, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 260 days.

(21) Appl. No.: 16/754,901

(22) PCT Filed: Sep. 28, 2018

(86) PCT No.: PCT/EP2018/076489
§ 371 (c)(1),
(2) Date: Apr. 9, 2020

(87) PCT Pub. No.: WO2019/072598
PCT Pub. Date: Apr. 18, 2019

(65) Prior Publication Data
US 2020/0265869 A1 Aug. 20, 2020

(30) Foreign Application Priority Data
Oct. 9, 2017 (DE) .......................... 102017123319.9

(51) Int. Cl.
*H04N 5/932* (2006.01)
*H04N 5/935* (2006.01)
(Continued)

(52) U.S. Cl.
CPC ............... *G11B 27/10* (2013.01); *H04R 1/08* (2013.01)

(58) Field of Classification Search
USPC .................................................. 386/207, 248
See application file for complete search history.

(56) References Cited

U.S. PATENT DOCUMENTS

| 5,208,678 A | * | 5/1993 | Nakagawa | ............. | H04N 5/928 |
|||||| 386/202 |
| 5,892,535 A | * | 4/1999 | Allen | ................. | H04N 7/17318 |
|||||| 348/E7.071 |

(Continued)

FOREIGN PATENT DOCUMENTS

| DE | 10 2010 038 838 | 2/2012 |
| JP | 2007-081686 | 3/2007 |

OTHER PUBLICATIONS

Search Report for Application No. PCT/EP2018/076489 dated Mar. 1, 2019.

(Continued)

*Primary Examiner* — Nigar Chowdhury
(74) *Attorney, Agent, or Firm* — Haug Partners LLP

(57) ABSTRACT

There is set forth a method and a system for recording and synchronizing audio and video signals. The audio signal and the video signal are stored together with time stamps from a respective associated system clock. The invention relates to an adaptation of the duration of the recorded audio sequence to the duration of an associated video sequence in order to level out differences in synchronization of the two system clocks. Alignment of the two system clocks is also introduced, which is based on a data transfer which has variable waiting times for the access to a transmission channel. This thus permits clock alignment with means as are available for example on a smartphone.

6 Claims, 4 Drawing Sheets

(51) Int. Cl.
   *G11B 27/10* (2006.01)
   *H04R 1/08* (2006.01)
   *H04N 9/80* (2006.01)

(56) References Cited

U.S. PATENT DOCUMENTS

| | | | | |
|---|---|---|---|---|
| 5,959,684 | A * | 9/1999 | Tan | H04N 19/42 375/240.26 |
| 7,474,724 | B1 * | 1/2009 | Gudmunson | H04N 5/12 375/376 |
| 10,135,601 | B1 * | 11/2018 | Beardsley | H04L 65/604 |
| 11,212,333 | B1 * | 12/2021 | Duffy | H04L 65/65 |
| 2002/0140858 | A1 * | 10/2002 | Wang | H04N 21/4341 375/E7.271 |
| 2003/0104310 | A1 * | 6/2003 | Dentinger | G03F 7/0045 430/914 |
| 2006/0167366 | A1 * | 7/2006 | Tomita | G06K 9/00523 600/518 |
| 2007/0124503 | A1 * | 5/2007 | Ramos | H04W 4/023 709/248 |
| 2008/0298532 | A1 * | 12/2008 | Wang | H04N 21/4305 375/376 |
| 2008/0304573 | A1 * | 12/2008 | Moss | H04N 21/43072 375/240.28 |
| 2009/0103897 | A1 * | 4/2009 | Chen | H04N 9/8063 386/338 |
| 2011/0043694 | A1 * | 2/2011 | Izuno | H04N 21/4392 348/E9.034 |
| 2012/0198317 | A1 * | 8/2012 | Eppolito | G11B 27/034 715/202 |
| 2015/0061971 | A1 * | 3/2015 | Choi | G06F 3/1454 345/2.3 |
| 2015/0104151 | A1 | 4/2015 | Webb et al. | |
| 2016/0006526 | A1 * | 1/2016 | Cho | H04J 3/0697 370/503 |
| 2016/0028925 | A1 * | 1/2016 | Fischer | H04N 5/067 348/521 |
| 2016/0112673 | A1 * | 4/2016 | Feng | H04M 7/0072 348/14.08 |
| 2016/0269136 | A1 | 9/2016 | Fair et al. | |
| 2017/0188092 | A1 * | 6/2017 | Lawrence | H04N 21/43615 |
| 2017/0262697 | A1 * | 9/2017 | Kaps | G11B 27/022 |
| 2018/0077443 | A1 * | 3/2018 | Lau | H04N 21/26233 |
| 2018/0288499 | A1 * | 10/2018 | Niemeyer | H04N 21/43637 |

OTHER PUBLICATIONS

Schmalenstroeer, Joerg [ et al.]: A gossiping approach to sampling clock synchronization in wireless acoustic sensor networks. In: International Conference on Acoustic, Speech and Signal Processing; 2014 IEEE International Conference on Acoustic, Speech and Signal Processing (ICASSP).

* cited by examiner

METHOD AND SYSTEM FOR RECORDING AND SYNCHRONIZING AUDIO AND VIDEO SIGNALS AND AUDIO AND VIDEO RECORDING AND SYNCHRONIZATION SYSTEM

CROSS-REFERENCE TO RELATED APPLICATIONS

This application is the National Stage entry under 35 U.S.C. § 371 of International Application No. PCT/EP2018/076489 filed Sep. 28, 2018, published as Publication No. WO 2019/072598 on Apr. 18, 2019, which claims benefit of foreign priority of German Patent Application No. 10 2017 123 319.9, filed on Oct. 9, 2017, the entireties of which are herein incorporated by reference.

FIELD OF DISCLOSURE

The present invention concerns a method and system for recording and synchronizing audio and video signals.

BACKGROUND

Mobile devices like smartphones are frequently equipped with a powerful camera. A zoom function makes it possible to film even events at a relatively great distance from the camera. That can involve for example a performance on the stage in a school auditorium, in which the user of the mobile device (camera unit) is sitting in the audience and makes a video recording of what is happening on the stage. An audio recording using a microphone included in the camera unit often gives unsatisfactory results as much unwanted ambient noise from the direct surroundings of the camera unit is recorded while the desired audio signal—for example the words spoken on the stage—is recorded too quietly and is lost in the ambient noise.

An external microphone can be used as a remedy for that. That can be for example a clip-on microphone which a performer on the stage has fastened to his clothing and which records the audio signal which is spoken or sung by the performer or an overall audio signal from the immediate vicinity thereof. If an external microphone is connected to the camera unit by way of a cable the audio signal from the external microphone can be stored directly at the same time as and thus synchronously jointly with the recorded video signal. In many situations of use—for example in the auditorium—wired transmission of the audio signal however is not practicable.

There is a wish to be able to receive the wirelessly emitted audio signal without additional hardware with a normal camera unit like for example a smartphone. Individualized wireless data transfer protocols are available for such mobile end-user devices. Examples that may be mentioned here are WLAN, Bluetooth, DECT, LTE or Wi-Fi, in which a data stream is respectively provided for a given end device and transmitted subdivided into individual data packets to the receiving user device. In the case of those data transfer protocols however an unpredictable time delay is tolerated in the transfer of each individual data packet as the use of a transmission channel in accordance with the protocol is coordinated as between a plurality of transmitting devices so that variable waiting times are involved for access to the transmission channel. In addition the transfer is normally bidirectional, in which respect a receiving device acknowledges successful reception and in the event of faulty transfer a data packet is transmitted afresh, which in addition results in unpredictable delay. Overall a delay of several seconds can occur. An audio signal received in that way is time-shifted by an unknown amount in relation to the video signal recorded by the camera unit, to such an extent that the time shift is perceived as being disturbing upon later consideration of the video/audio signal. Without additional synchronization measures it is not possible for the audio signal to be subsequently shifted to the correct place with respect to the video signal.

As a further alternative to wireless transfer storage of the audio signal in the external microphone unit can also be considered. The audio signal from the external microphone unit is then subsequently brought together with the video signal from the camera unit. In this case also the problem that arises is that of subsequently bringing the audio signal to the correct place on the time axis with respect to the video signal.

DE 10 2010 038 838 A1 discloses a wireless microphone system in which a microphone unit records an audio signal and stores it jointly with "time stamps" and wherein a camera unit stores corresponding time stamps jointly with the video signal and wherein the camera unit emits synchronization signals, on the basis of which the microphone unit produces time stamps matching the video signal.

WO 2016/162560 A1 discloses a method of synchronizing audio and video signals by means of optical synchronization signals.

On the German patent application from which priority is claimed the German Patent and Trade Mark Office searched the following documents: US 2015/0 104 151 A1, US 2016/0 269 136 A1, JP 2007-81 686 A and SCHMALENSTROEER, JOERG [et al:]: A gossiping approach to sampling clock, synchronisation in wireless acoustic sensor networks. In: International Conference on Acoustic, Speech and Signal Processing (ICASSP), Florence, Italy; IEEE Transactions, 14 Jul. 2014, pages 7575-7579.

SUMMARY OF INVENTION

An object of the present invention is to provide a method and system for recording and synchronizing audio/video signals, which allow subsequent synchronization of audio and video signals which belong together.

The object is attained by a microphone unit as set forth in claim 1, a system of recording and synchronizing audio/video signals as set forth in claim 2 and a method of recording and synchronizing audio/video signals as set forth in claim 3.

Thus there is provided a microphone unit having a microphone for recording audio signals, a transmitter/receiver for wireless bidirectional communication with a video unit which has a first system clock with a first time base, a second system clock with a second time base, and a memory for digital storage of an audio signal recorded with the microphone and time synchronization information. The microphone unit is adapted to repeatedly store in the memory jointly with an audio signal recorded by the microphone audio time stamps which specify the respective times of recording the audio signal measured with the second system clock. The transmitter/receiver is adapted to communicate with the video unit by way of a data transfer protocol which is provided for a coordinated use of a used transmission channel by a plurality of transmitting and receiving devices and which has measures for time coordination of the access of different devices to the transmission channel so that variable waiting times can occur for access to the transmission channel. The microphone unit is adapted by way of the transmitter/receiver to carry out an alignment between the first system clock and the second system clock, wherein the alignment result includes a time value of the first system clock and an associated time value of the second system clock. The alignment is effected by the video unit or the microphone unit as the initiating unit firstly reading out a current transmission time value from its system clock and temporarily storing it and immediately initiating a first transfer process to the other of the two units. The respective other unit after conclusion of the first transfer process immediately reads out a current synchronization time value from its system clock and transfers said synchronization time value in a second transfer process to the initiating unit. The initiating unit upon reception of the second transfer immediately reads a current reception time value from its system clock and from the transmission time value and the reception time value calculates a time value belonging to the synchronization time value.

According to a further aspect of the invention there is provided an audio/video recording and synchronization system comprising a microphone unit and a video unit. The video unit includes a camera unit for recording video signals, a transmitter/receiver for wireless bidirectional communication with the microphone unit, a first system clock with a first time base, and a memory for digital storage of a video signal recorded with the camera unit and time synchronization information. The video unit is adapted to repeatedly store in the memory together with a video signal recorded by the camera unit video time stamps which specify the respective times of recording of the video signal measured with the first system clock. The video unit is adapted by way of the transmitter/receiver to carry out an alignment between the first system clock and the second system clock.

According to a further aspect of the invention there is provided a method of recording and synchronizing audio and video signals comprising the steps: recording a video signal by means of a video unit and storing the video signal together with video time stamps which specify the respective times of recording of the video signal measured with a first system clock, recording an audio signal by means of a microphone unit and storing the audio signal together with audio time stamps which specify the respective times of recording of the audio signal measured with a second system clock, carrying out an alignment between the first system clock and the second system clock, wherein the alignment result contains a time value of the first system clock and an associated time value of the second system clock, and bringing together the audio signal and the video signal, wherein time synchronization is effected on the basis of the video time stamps, the audio time stamps and the alignment result.

According to a further aspect of the invention alignments are carried out repeatedly at different times between the first system clock and the second system clock and alignment results are stored.

According to a further aspect of the invention the method further includes the step of again sampling the recorded audio signal with an altered sampling frequency to adapt the length of the audio signal to the length of the video signal.

According to a further aspect of the invention the method additionally includes the steps: reading out the starting time of a video sequence on the basis of the video time stamps, reading out the end time of a video sequence on the basis of the video time stamps, calculating an audio start time in the audio recording which belongs to the starting time of the video sequence on the basis of the audio time stamps and alignment results, calculating an audio end time in the audio recording which belongs to the end time of the video sequence on the basis of the audio time stamps and alignment results, re-scaling the audio sequence between the audio start time and the audio end time so that the duration of the rescaled audio sequence nominally coincides with the duration of the video sequence, and bringing the video sequence together with the rescaled audio sequence.

According to a further aspect of the invention the alignment between the first system clock and the second system clock is effected by a pingpong synchronization. A data packet is transmitted from the video unit to the audio unit and the packet is then transmitted from the audio unit to the video unit in order to carry out a comparison of a system clock of the video unit and a system clock of the audio unit to ascertain a shift between the system clock of the video unit and the microphone unit.

According to a further aspect of the invention the alignment between the first system clock and the second system clock is effected by way of a bidirectional wireless connection between the video unit and the microphone unit. In that case a data transfer protocol is used, which is provided for a coordinated use of a used transmission channel by a plurality of transmitting and receiving devices and which has measures for time coordination of the access of different devices to the transmission channel so that variable waiting times can occur for access to the transmission channel. The alignment is effected by the video unit or the microphone unit as the initiating unit firstly reading out a current transmission time value from its system clock and temporarily storing it and immediately initiating a first transfer process to the other of the two units, and wherein the respective other unit after conclusion of the first transfer process immediately reads at a current synchronization time value from its system clock and transfers said synchronization time value in a second transfer process to the initiating unit. The initiating unit upon reception of the second transfer immediately reads out current reception time value from its system clock and from the transmission time value and a reception time value calculates a time value belonging to the synchronization time value.

According to a further aspect of the invention a first alignment between the first system clock and the second system clock is initiated at the beginning of a video recording and a second alignment is initiated with the end of the video recording.

Further configurations of the invention are subject-matter of the appendant claims.

Advantages and embodiments by way of example of invention are described in greater detail hereinafter with reference to the drawings.

DETAILED DESCRIPTION

Figure 1A:
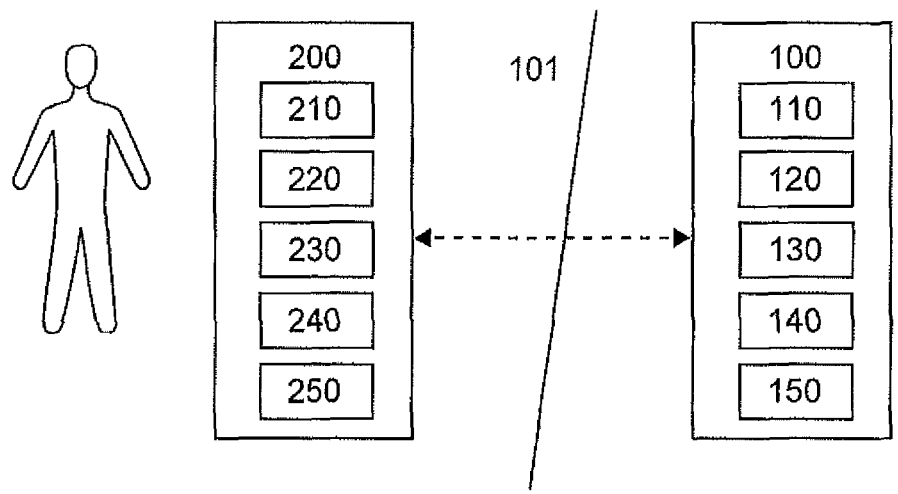
FIG. 1A shows a diagrammatic view of a system for recording and synchronizing audio and video signals according to a first embodiment.

FIG. 1 shows a situation of use of a microphone unit and a video unit according to a first embodiment of the invention. A performer 102 is on the stage. A video recording of what is happening on the stage is produced with a camera unit 10 from an auditorium. A microphone unit 200 is to be found on the stage 101 at the performer 102. The microphone unit can be for example a clip-on microphone, a hand-held microphone or a body unit connected to a microphone by way of a cable. Optionally the microphone unit 200 can also be positioned separately from the performer, for example on a microphone stand on the stage 101.

The video unit 100 in FIG. 1 has a transmitter/receiver 110, a first system clock 120 with a first time base, a camera unit 130 for recording a video signal and optionally a first synchronization unit 140. The video unit 100 also has a memory 150 in which inter alia a recorded video signal can be stored. The video unit 100 is in particular a normal mobile end-user device like for example a smartphone, which allows digital recording of a video signal and which is provided for wireless bidirectional transfer of digital data. For use in the context of the invention suitable software can be installed on the video unit.

According to the first embodiment the microphone unit 200 has a transmitter/receiver 210, a second system clock 220 with a second time base, a microphone 230 for recording an audio signal and a second synchronization unit 240. Recording of the audio signal of the microphone unit is effected in digital form by sampling the signal recorded by the microphone 230, using a sample rate which is produced in the microphone unit 200.

The microphone unit 200 has a memory 250 in which inter alia a recorded audio signal can be stored.

The transmitter/receiver 110 of the video unit 100 can communicate wirelessly with the transmitter/receiver 210 of the microphone unit 200. Detection of synchronization can be effected by the first synchronization unit 140 or by the second synchronization unit 240.

On the basis of the first system clock 120 the video unit 100 can repeatedly store time information (video time stamps) together with a recorded video signal, the time information specifying the respective times of recording of the video signal—measured with the first system clock 120. Correspondingly, on the basis of the second system clock 220, the microphone unit 200 can repeatedly store time information (audio time stamps) together with an audio signal recorded by the microphone unit, which time information specifies the respective times of recording of the audio signal—measured with the second system clock 220.

A first problem arises because the time shift between the first system clock 120 and the second system clock 220 is normally unknown so that the time information recorded on the two devices is alone not sufficient to subsequently permit a correct association in respect of time between the video signal and the audio signal. According to an aspect of the present invention therefore an alignment is carried out between the two system clocks 120 and 220, wherein the alignment is implemented by a particular use of a data protocol which is available on an end-user device and which is actually not intended to ensure a predictable time shift in the transmission. A more precise description of that use of such a data protocol is set forth hereinafter with reference to FIGS. 7A through 9.

Alignment is effected by simultaneously ascertaining the time value of the first system clock 120 and the second system clock 220. The two simultaneously ascertained time values can then be stored jointly. Storage of the two associated time values can be effected in the memory 250 of the microphone unit 200 and/or in the memory 150 of the video unit 100. By virtue of the access to that stored information it is later possible to carry out a correct time association between the video signal recorded with video time stamps on the basis of the first system clock 120 and the audio signal recorded with audio time stamps on the basis of the second system clock 220. It is not necessary for that purpose to adjust one of the system clocks 120 and 220, but it is only the information in respect of the time values of the two system clocks that is ascertained at a common time and stored.

Differences in Speed of the System Clocks:

A second problem arises out of the fact that the two system clocks normally do not run at exactly the same speed. This can have the result that a video sequence which is recorded by the video unit 100 and which begins at a real start time and ends at a real end time appears longer or shorter in the measurement in accordance with the first system clock 120, than the period which has actually elapsed. The same applies to the second system clock 220 so that the audio sequence which is recorded by the microphone unit 200 and which begins at the real start time and ends at the real end time appears longer or shorter in measurement in accordance with the second system clock 220 than the period which has really elapsed. Independently of the really elapsed period therefore with system clocks 120 and 220 running at different speeds, the video sequence in measurement with the first system clock 120 is of a different duration from the associated audio sequence in the measurement with the second system clock 220. In order to counter that problem alignment between the two system clocks is effected according to the invention a plurality of times, that is to say at different times, and the result is stored a plurality of times, as described above. Optionally a first alignment operation can be provided prior to or with the beginning of a video recording and a second alignment operation can be carried out with or after the conclusion of the video recording. Alternatively a alignment operation can be carried out before the beginning of an event and a second alignment operation can be carried out after the conclusion of an event. An alignment test is also usually planned, in which case a result is produced only when a wireless or wired connection exists between the video unit 100 and the microphone unit 200, which allows alignment.

On the basis of stored alignment results which were ascertained at different times the unequal speed as between the first and the second system clocks can be measured and that information can be processed when bringing the video and the audio signals together. If for example a video signal in the measurement with the first system clock 120 involves a duration of 1000 seconds and an audio signal recorded during the same real period in measurement with the second system clock 220 is of a duration of 1001 seconds, then the audio signal can be processed in such a way that it is re-scaled to a duration of 1000 seconds. For the digitally recorded audio signal that can be carried out with a known algorithm for sample rate conversion. As a result an audio signal is then available, the duration of which is nominally precisely 1000 seconds and which also exactly matches the recorded video signal in the number of audio sample values ascertained in that way.

Figure 1B:
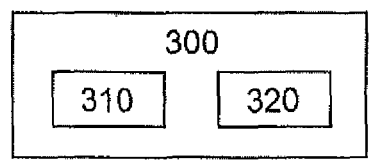
FIG. 1B shows a diagrammatic view of an external device in which optionally processing of video and audio data can be carried out.

FIG. 1B shows a diagrammatic view of an external device 300 in which processing of video and audio data can optionally be carried out. According to an aspect of the present invention the video signal of the video unit 100 and the audio signal of the microphone unit 200 can be processed in an external device 300. For that purpose the external device can have a transmitter/receiver 310 and an audio signal sampling unit 320. The audio signal sampling unit can alternatively also represent a part of the video signal 100.

According to an aspect of the present invention the video signal 100 can be in the form of a smartphone.

Figure 2:
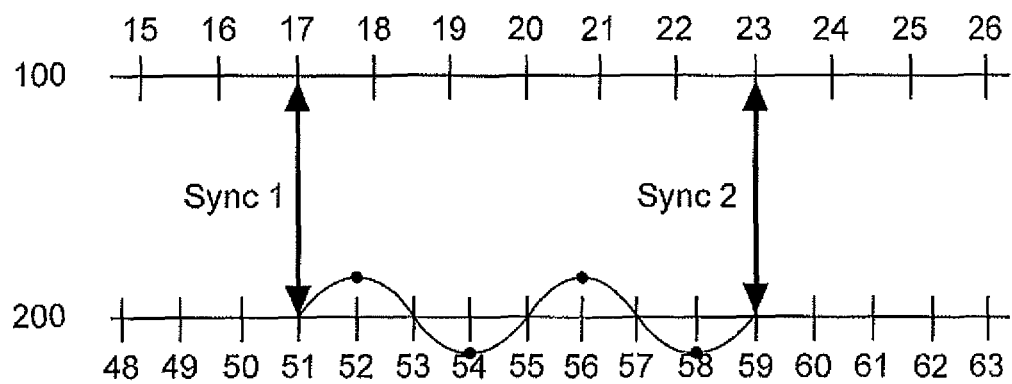
FIG. 2 shows a diagrammatic view of system clocks of the video unit and the audio unit.

FIG. 2 shows a diagrammatic view of system clocks of the video unit and the audio unit according to the first embodiment. FIG. 2 shows a system clock of the video unit 100 and a system clock of the audio unit 200 on a time axis. A first synchronization Sync1 is effected at the beginning of the audio and/or video recording and serves to detect the shift between the system clock 120 of the video unit 100 and the system clock 220 of the audio unit 200. The time difference between the first and second system clocks is constant when both system clocks are operated at the same speed. As however by virtue of tolerances (tolerances in the quartzes, temperature fluctuations) the first and second system clocks are not running at the same speed in accordance with the invention a second synchronization Sync2 is effected at the end of the audio and/or video recording. Because a first and a second synchronization Sync1, Sync2 is effected a difference in speed in the two system clocks can be ascertained therefrom. If the speed difference is known it can be suitably compensated for example by re-sampling of the audio signals of the microphone 200.

To compensate for the differences in speed of the first and second system clocks the audio signal of the microphone 200 can be sampled again with an adapted sampling frequency. When that is done the video signal then matches the new audio signal. The fresh sampling of the audio signal can be ascertained by computation from the original audio signal of the microphone 200.

According to an aspect of the present invention the audio signal and the video signal can be brought together in a device 300. That device 300 can be for example a smartphone, tablet or the like which also has the video unit. As an alternative thereto it is possible to use an external device.

Figure 3:
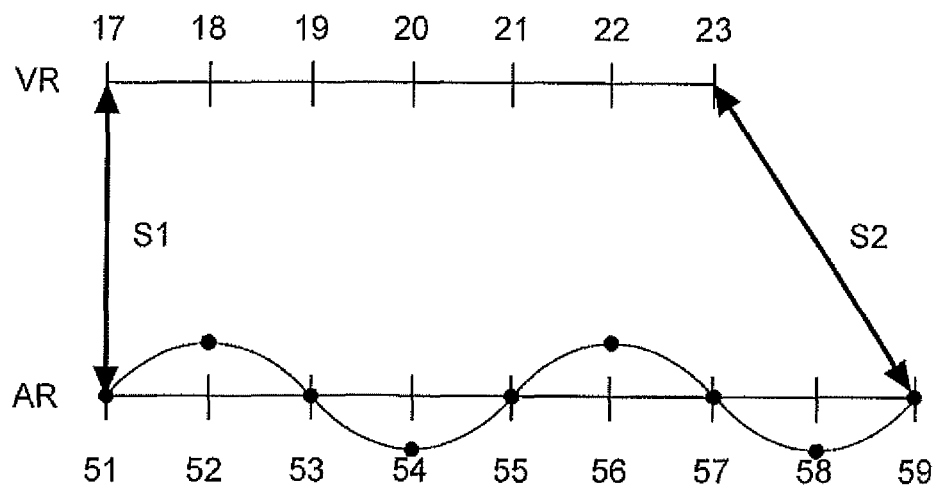
FIG. 3 shows a further diagrammatic view of the system clocks of the video unit and the audio unit in the case of system clocks running at differing speeds.

FIG. 3 shows a further diagrammatic view of the system clocks of the video unit and the audio unit with system clocks which run at different speeds. FIG. 3 shows a video recording VR and an audio recording AR on a time axis. In that case a start of the recording occurs at S1 and a stop of the recording occurs at S2. The video recording VR begins at a time S1, in relation to which the first system clock 120 specifies a time "17". The video recording VR ends at a time S2, in relation to which the first system clock specifies a time "23". At the time S1 the second system clock 220 specifies a time "51" for the audio recording AR and at the time S2 the second system clock 220 specifies a time "59". As in this example the second system clock 220 of the microphone unit 200 is running at a higher speed than the system clock of the video unit the audio recording AR is nominally longer than the video recording. This means that the two signals, with the same time base, are of different lengths.

Figure 4:
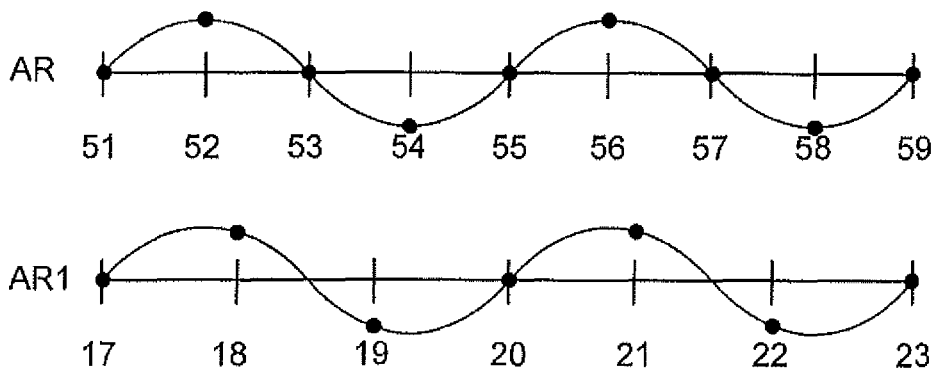
FIG. 4 shows a diagrammatic view of processing of the audio recording recorded in accordance with FIG. 3.

FIG. 4 shows a diagrammatic view of processing according to the invention of the audio recording AR in accordance with FIG. 3. FIG. 4 shows in particular how correction of the sampling frequency of the audio signal is effected. FIG. 4 shows the audio recording AR and the freshly sampled audio recording AR1. In order to compensate for the different speeds of the first and second system clocks the audio signal is again sampled by computation with an altered sampling frequency. That freshly sampled audio signal is shown as the audio signal AR1 in FIG. 4. From the contained audio information relating to the representation of a continuous audio signal the audio signal AR1 corresponds to the originally recorded audio recording AR but is re-scaled to a duration from a measurement time "17" to a measurement time "23" so that the sampling points of the originally recorded representation AR and the representation AR1 ascertained by computation differ from each other.

Figure 5:
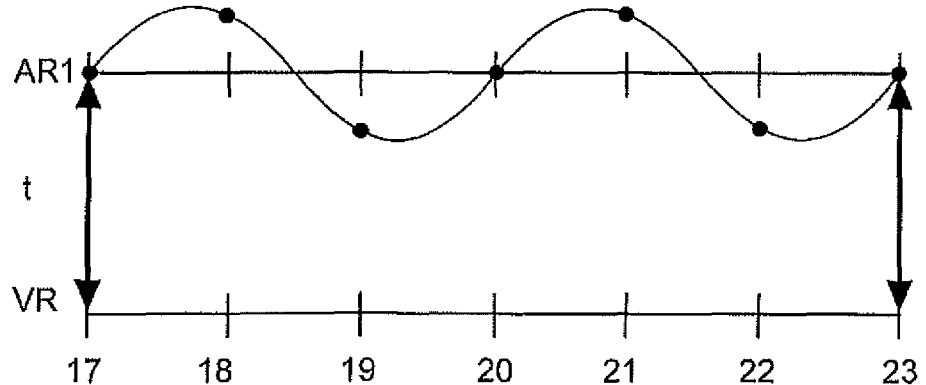
FIG. 5 shows a diagrammatic view of a corrected audio data file and video data file according to an aspect of the present invention.

FIG. 5 shows a diagrammatic view of a corrected audio data file and video data file according to an aspect of the present invention. In FIG. 5 the audio signal AR1 is now provided with the same system clock or sampling frequency as the video recording VR, that is to say those two signals have the same time base. That provides that the audio recording and the video recording AR1, VR are synchronous.

According to an aspect of the present invention instead of renewed sampling of the audio signal parts can be removed from the recorded audio signal or synthetic portions can be added to reduce or increase the length of the audio recording and to adapt the length of the audio recording to the length of the video recording.

Even if a wireless connection is not available between the video unit 100 and the microphone unit 200 at the beginning and/or end of a video recording it is possible, from stored system clock alignment results which were ascertained at different times, to approximately subsequently calculate in relation to each desired time value of the first system clock 120, a time value that the second system clock 220 had at the association time. For that purpose it can be assumed that both system clocks in themselves are running approximately at a constant speed.

Figure 6:
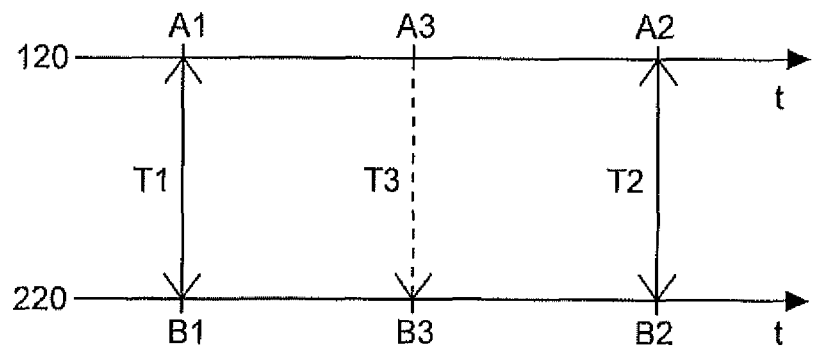
FIG. 6 shows a diagrammatic view of the first system clock and the second system clock in relation to time in accordance with an aspect of the present invention.

FIG. 6 shows a diagrammatic view of the first system clock 120 and the second system clock 220 in relation to time t. A first alignment effect took place at a first time T1, at which the first system clock 120 had a time value A1. It is known from that first alignment operation that the second system clock 220 had a time value B1 at that first time T1. At another second time T2 at which the first system clock 120 had a time value A2 a second alignment operation took place. It is known from that second alignment operation that the second system clock 220 had a time value B2 at that second time T2.

If now for example a video recording began at a third time T3 at which the first system clock 120 had a time value A3 and which was stored as a video time stamp with the video signal, at which however no alignment of the system clocks has occurred, the time value B3 that the second system clock had at that third time T3 can be calculated according to the following formula:

$$B3=B1+(B2-B1)/(A2-A1)*(A3-A1)$$

FIG. 6 shows the situation where the third time T3 is between the two alignment times T1 and T2. The formula however can also be applied if that is not the case. That can be advantageous for example if firstly no system clock alignment has occurred before the microphone unit 200 has stored in its memory 250 an audio signal including associated audio time stamps and the video unit 100 has also stored in its memory 150 a video signal including associated video time stamps, and wherein the video signal has a video time stamp with a time value A3. If a first and a second system clock alignment operation is now repeated, only after the recording of those two signals at different times T1 and T2, it is nonetheless possible by means of the specified formula to also subsequently approximately determine the time value B3 that the second system clock 220 had at the time T3.

Basically therefore two system clock alignment results which were ascertained at two different times are sufficient to calculate at any time value A3 of the first system clock 120 an associated time value B3 that the second system clock 220 had at that time. To achieve a high level of accuracy alignment times which are in the proximity in respect of time of the respective times being considered should be used as far as possible for the calculation. It is also advantageous for accuracy if the two alignment times are not too close together.

The described calculation of associated time values of the first and second system clocks can be applied both to the beginning and also the end times of a video sequence, as well also for other values of additional time support locations.

System Clock Alignment by Way of Data Transfer Protocol:

As explained above alignment of the first system clock 120 with the second system clock 220 is based on simultaneously ascertaining the time value of the first system clock 120 and the second system clock 220. It will be noted however that many end devices like in particular smartphones do not have available a wireless data transfer protocol which would ensure a predictable time shift in transmission. Transmission for example by way of WLAN, Bluetooth, DECT, LTE or WiFi as explained above includes an unpredictable time shift so that time alignment by simply transferring a time value for example from the first system clock 120 by way of such a transfer protocol to the microphone unit could not afford the desired effect of a defined simultaneous ascertainment of the time values of the two system clocks with adequate accuracy.

Hereinafter therefore a method in accordance with an aspect of the invention is set forth, in which alignment is implemented by particular use of a data transfer protocol which is available on an end-user device and which is actually not intended to ensure a predictable time shift in transmission.

According to a second embodiment alignment is carried out by means of a method which hereinafter is to be descriptively referred to as "pingpong synchronization". In that case a data packet is communicated from one of the devices to the other and then the second device communicates the data packet together with a time value of its system clock back to the first device.

Figure 7A:
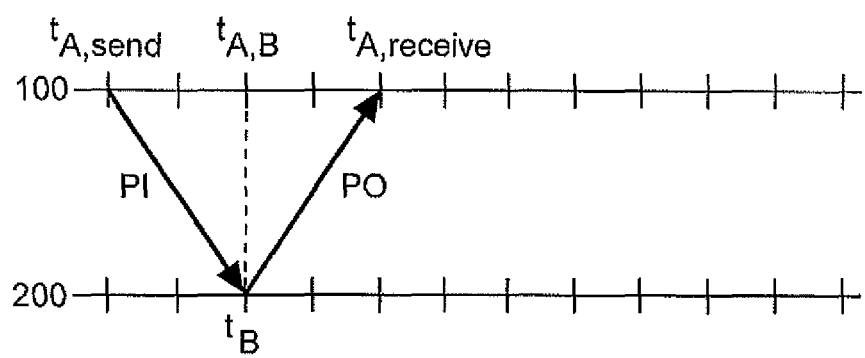
FIG. 7A shows a diagrammatic view of a synchronization between a video unit and an audio unit.

FIG. 7A shows a diagrammatic view of synchronization between a video unit and an audio unit according to a second embodiment of the invention. FIG. 7A shows synchronization according to the invention on a time axis, wherein in the illustrated example the transmission of data from the video unit 100 to the microphone unit 200 and back involves identical transmission times. The video unit 100 firstly reads its current time value $t_{A,send}$ from the first system clock 120, puts that value into interim storage and immediately sends a data packet by way of an available data transfer protocol to the microphone unit 200. That transfer process PI ("ping") starts alignment. The microphone unit 200 receives the data packet and immediately responds by in turn reading its current time value $t_B$ out of the second system clock 220 and transmitting that read-out time value with a second transfer process PO ("pong") to the video unit 100. Upon receipt of the second transmission PO the video unit 100 immediately again reads its current time value $t_{A,receive}$ out of the first system clock 120.

The video unit 100 therefore now knows the state $t_{A,send}$ of the first system clock 120 at the time of the beginning of the transfer PI and the state $t_{A,receive}$ of the first system clock 120 at the time of the end of the transfer PO. Then from those two time values read out of the first system clock 120 the video unit 100 can easily calculate by averaging a time value $t_{A,B}$ which is centrally between those two time values and which thus forms a first plausible estimate for the time value that the first system clock 120 had at the time at which the time value $t_B$ was read out of the second system clock 220:

$$t_{A,B} = t_{A,send} + (t_{A,receive} - t_{A,send})/2$$

FIG. 7A shows the optimum situation in which no uncontrollable delays have occurred both in the first transfer PI and also in the second transfer PO. In addition FIG. 7A assumes an identical transfer time for the first transfer PI and the second transfer PO. In the optimum case shown in FIG. 7A the time value $t_{A,B}$ calculated in that way even exactly corresponds to the sought time value that the first system clock 120 had at the time when the second system clock 220 output the time value $t_B$.

In addition that time value $t_B$ that the second system clock 220 had at the time between the transfers PI and PO is available to the video unit 100 from the second transfer PO. Therefore an alignment result is available in the video unit 100 with $t_{A,B}$ and $t_B$, which result represents the state of the two system clocks 120 and 220 at a common time and which can be stored for later use in the memory 150. Therefore simultaneous detection of the time values of the two system clocks is effected so that the desired system clock alignment has succeeded.

Optionally the alignment results can also be transmitted to the microphone unit 200 in a further data transfer and also stored there in the memory 250. The described start of alignment can also be triggered in a completely identical fashion by the microphone unit 200 so that the microphone unit 200 and the video unit 100 then perform precisely reversed roles.

As described in the opening part of this specification the available data transfer protocols—in particular caused by unknown waiting times for access to a transmission channel jointly used with other devices—involve unpredictable delay times. In the described pingpong synchronization procedure both the first transfer operation PI and also the second transfer operation PO are thus undefinedly extended in length. It is also not possible either for the respective transmitting device nor for the respective receiving device to ascertain the transfer time which has occurred in an individual transfer. The result of this can be that the calculated time value $t_{A,B}$ differs from the actual time value that the first system clock 120 had at the time when the second system clock 220 output the time value $t_B$.

Figure 7B:
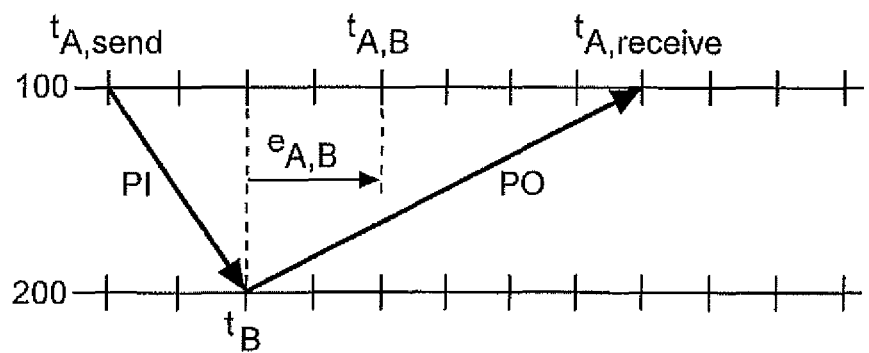
FIG. 7B shows a diagrammatic view of a synchronization between a video unit and an audio unit according to an aspect of the invention.

FIG. 7B shows a diagrammatic view of synchronization between a video unit 100 and an audio unit 200 for such a case. Here as in the optimum case in FIG. 7A the first transfer PI was effected without a delay. In the second transfer PO however it was necessary to wait for use of the transmission channel being used so that the second transfer PO lasted longer. In calculation of the time value $t_{A,B}$ from the time values $t_{A,send}$ and $t_{A,receive}$ read out of the first system clock 120 there is an error $e_{A,B}$ which gives the deviation between the calculated value $t_{A,B}$ and the actual time value that the first system clock 120 had at the time when the time value $t_B$ was read out of the second system clock 220. As it is not known whether the delay occurred in the first transfer process PI or in the second transfer process PO or possibly in both transfer processes the above-specified formula for calculating the time value $t_{A,B}$ however represents the best estimate which can be determined from a the single pingpong cycle.

Figure 8:
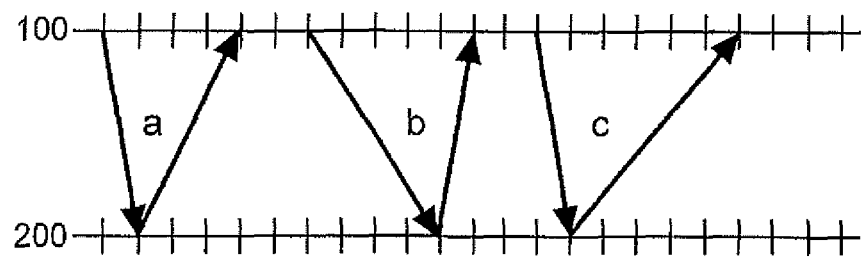
FIG. 8 shows a diagrammatic view of a synchronization measurement according to an aspect of the present invention.

FIG. 8 shows a diagrammatic view of synchronization measurement in accordance with an aspect of the present invention. In the aim of reducing the error $e_{A,B}$ a plurality of transfer processes PI and PO are here carried out in succession. FIG. 8 shows such a series of three pingpong cycles a, b and c between the video unit 100 and the microphone unit 200 on a time axis.

In order now from the series of pingpong cycles to produce a time alignment with an error $e_{A,B}$ which is as slight as possible that pingpong cycle which had overall the shortest duration can be selected from the series. In FIG. 8 that is the pingpong cycle a. The video unit can recognize the shortest pingpong cycle on the basis of the time values $t_{A,send}$ and $t_{A,receive}$ stored for each pingpong cycle. The shortest pingpong cycle evidently involves the least delays so that this shortest cycle provides the best estimate for time alignment. If the transmission channel is not overloaded there is a good chance that even the optimum case shown in FIG. 7A occurs, in which neither the first transfer process PI nor the second transfer process PO was delayed. Therefore, for time alignment only the shortest pingpong cycle, in the example of FIG. 8 therefore only the pingpong cycle a, is used. The time value $t_{A,B}$ is correspondingly only calculated from the time values $t_{A,send}$ and $t_{A,receive}$ associated with the cycle a and associated with the time value $t_B$ of the second system clock, that is ascertained from the cycle a. Therefore a reduction in the error $e_{A,B}$ is achieved by evaluation of a series of pingpong cycles to ascertain a single time alignment effect.

If the transmission channel is so heavily loaded that the occurrence of the optimum situation shown in FIG. 7A is not to be expected for an individual pingpong cycle then optionally a tolerance range for the alignment result can be determined by more precise analysis of a series of pingpong cycles. For that consideration firstly here a "clock offset" CO will be defined, which specifies the difference between a time value of the second system clock 220 and a simultaneously ascertained time value of the first system clock 120. The clock offset CO therefore gives the relationship between the first and second time bases. The actual value of CO is not known and is to be ascertained by measurement. As an estimate for CO for each pingpong cycle a shift $O_{A,B}$ is specified, which gives the difference between the read-out time value $t_B$ from the second system clock 220 and the time value $t_{A,B}$, calculated in relation thereto, of the first system clock 120, for a respective individual pingpong cycle:

$$O_{A,B}=t_B-t_{A,B}$$

In addition a minimum value $t_{transmit,min}$ can be assumed to be known for the duration of an individual transfer process PI or PO respectively (as shown for the optimum case in FIG. 7A). From each individual pingpong cycle it is then possible to specify a maximum value $e_{A,B,max}$ for the error, that the calculated shift $O_{A,B}$ can have in relation to the value CO which is being sought:

$$e_{A,B,max}=(t_{A,receive}-t_{A,send})/2-t_{transmit,min}$$

That greatest error occurs when only one of the transfer processes PI or PO has a delay, but the other is effected without any delay (see FIG. 7B). The error $e_{A,B}$ is therefore at a maximum as great as half the measurement duration minus the shortest possible transmission time $t_{transmit,min}$, wherein in this embodiment it is assumed that the shortest possible transmission time from the video unit 100 to the microphone unit 200 (PI) corresponds to the shortest possible transmission time from the audio unit 200 to the video unit 100 (PO). If a minimum value $t_{transmit,min}$ for the duration of an individual transmission process PI or PO is not known the value zero can be set here.

For each individual pingpong cycle it is now possible on the basis of the respectively known possible error to specify an interval in which the actual value of a clock offset CO must be.

Figure 9:
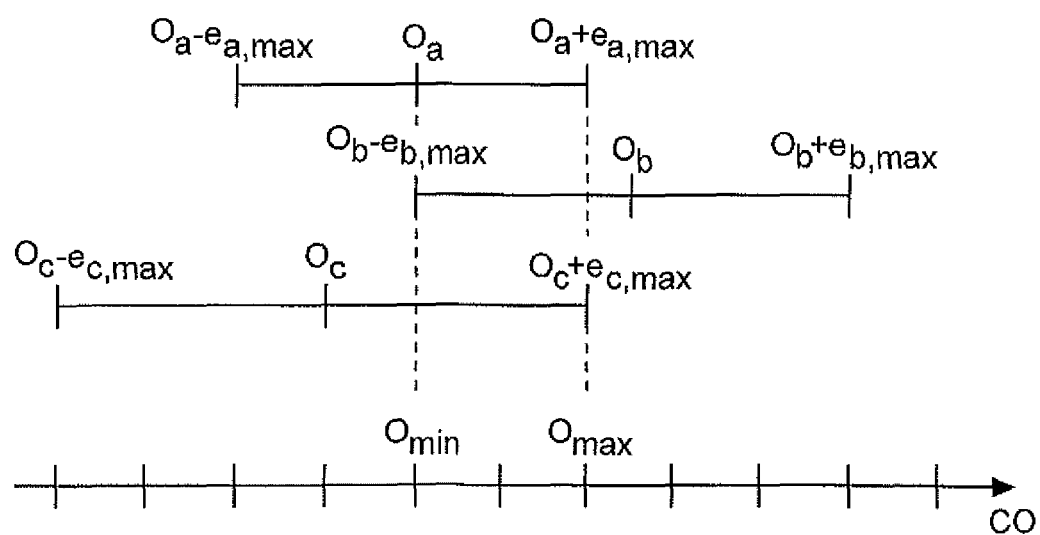
FIG. 9 shows a diagrammatic view of the offset of the system clocks of the video unit and the microphone unit, that is ascertained from a synchronization measurement.

FIG. 9 shows a diagrammatic view of the shift, ascertained from a synchronization operation, of the system clocks of the video unit and the audio unit. FIG. 9 shows on the time axis for the clock offset CO the intervals which occur in the FIG. 8 example from the three pingpong cycles a, b and c. A shift Oa was calculated from pingpong cycle a and the maximum value of the error $e_{a,max}$ calculated for cycle a specifies respectively plotted negatively and positively the limits of the interval in which the actual value of a clock offset CO in accordance with cycle a must lie. Intervals around Ob and Oc in which the actual value of a clock offset CO must lie are respectively corresponding plotted for cycles b and c.

There are different intervals for the various pingpong cycle, in which the actual value of the clock offset CO must lie. As the actual value of CO must lie in each of the ascertained intervals the actual value of CO can only lie in a range in which all ascertained intervals overlap. In FIG. 9 that is characterised as a tolerance range from Omin through Omax. As can be seen from FIG. 9 that tolerance range is normally smaller than the intervals from the individual pingpong cycles. Upon closer analysis it can be established that the difference from the lower limit Omin of the tolerance range to the correct value of CO corresponds to the duration of the shortest first transfer process PI from all considered cycles. This correspondingly means that the difference from the correct value of CO to the upper limit Omax of the tolerance range corresponds to the duration of the shortest second transfer process PO from all considered cycles. If therefore an undelayed first transfer process PI and an undelayed transfer process PO were at all contained in the series of pingpong cycles the average value between Omin and Omax precisely specifies the correct value for CO.

From the value ascertained in that way for CO it is then possible, with one of the time values $t_B$ read out of the second system clock 220 during the measurements, to calculate an associated value $t_{A,B}$ which with a high level of probability corresponds to the actual value that the first system clock 120 had, when the time value $t_B$ was read out of the second system clock:

$$t_{A,B}=t_B-CO$$

Those two time values $t_B$ and $t_{A,B}$ ascertained from a series of pingpong cycles then form the result of time alignment which can then be stored in the memory 150 of the video unit and/or in the memory 250 of the microphone unit.

According to an aspect of the present invention with a Bluetooth connection it is possible to achieve a measurement duration of 5 ms, whereby a maximum possible error in synchronization is at 0.5 ms.

According to the invention a block-based transmission is effected by way of a wireless channel, the blocks being of different latencies. According to the invention a synchronization signal is to be produced the video signal and the wirelessly received audio signal. The microphone unit 200 can store time stamps in the audio signal. The video unit 100 can store time stamps in the video signal.

Typical Situation of Use of the Overall System:

A typical situation of use of the overall system is described hereinafter: before the beginning of an event a bidirectional wireless connection is made for the purposes of the transmission of the audio data and alignment of the system clocks by way of the transmitter/receiver 110 in the video unit 100 (in particular a smartphone) and the transmitter/receiver 210 in the microphone unit 200. That involves using an individualized data transfer protocol which is available on the video unit 100 and in which there is provided a data stream for a respective given end-user device and which is transmitted subdivided into individual data packets to the receiving end device. The data transfer protocol is characterized in that coordinated use of a transmission channel involved is provided by a plurality of transmitting and receiving devices and the data transfer protocol has measures for time coordination of the access of various devices to the transmission channel. The result of this is that variable waiting times can occur for access to the transmission channel so that the time implementation of transmission of a respective data packet cannot be accurately predicted. As examples mention will be made here of WLAN, Bluetooth, LTE and Wi-Fi.

As soon as the wireless connection exists a first system clock alignment is carried out in accordance with the foregoing description and the result of alignment is stored in the memory 150 of the video unit and/or in the memory 250 of the microphone unit. Alignments of the system clocks are again planned by way of the wireless connection regularly, for example at spacings of a second. A result of the alignment procedure however is stored only if the wireless connection respectively permits alignment. The bidirectional wireless connection is classified as connected in the further proceeding from both sides during the event, even if no data transfer occurs over a prolonged period of time.

In parallel with the constitution of the bidirectional wireless connection the microphone unit 200 begins therewith continuously, that is to say without interruptions, to record an audio signal with the associated audio time stamps and to store the result in its memory 250. The microphone unit 200 is then taken during the event to the location at which the microphone signal is to be detected, that is to say for example on the stage, or it is fastened as a clip-on microphone to a performer or is held in the hand by the performer. During the event the video unit 100 is taken to a location from which a video recording is to be made. This can be a position in the auditorium, from which the user of a smartphone would like to make video recordings. By virtue of the spatial distance between the microphone unit 200 and the video unit 100 and possibly numerous competing access attempts for accessing the transmission channel used ongoing existence of the wireless connection can possibly not be reliably guaranteed during the event.

Typically only individual sections of an event are recorded with the video unit 100. If the user of the video unit 100 now starts to record a video sequence it would normally be necessary to transmit that start information to the microphone unit 200 as far as possible at the same time by way of the wireless connection so that it begins at the same time as the recording of an associated audio sequence and the transmission thereof. In the typical use described herein of a system according to the invention however, having regard to the background of an unreliable wireless connection, it is possible to dispense with that activation of the microphone unit as the audio recording is in fact carried out continuously together with storage in the memory 250. Instead the video unit transmits to the microphone unit by way of the wireless connection time information which specifies the time of the beginning of the video sequence—based on the first system clock 120. In that case the time information can be transmitted in the form of the first time base. The microphone unit 200 then calculates on the basis of the previous time alignment results the associated time value of the second system clock 220. Alternatively conversion to the second time base can already be effected on the basis of previous time alignment results prior to transmission in the video unit 100 so that the transmitted time information already specifies the associated time value of the second system clock 220. If the described time information should only arrive at the microphone unit with a delay due to a delayed transmission then nonetheless as described with reference to FIG. 6 the corresponding time can be found in the stored audio signal on the basis of the stored audio time stamps and the existing alignment information for the two system clocks. The specified transmission of the video beginning time information serves at the same time as a request to the microphone unit 200 to transmit a part from the stored audio signal to the video unit 100. The microphone 200 in response to that request transmits a part of the stored audio signal which begins at said time to the video unit 100 by way of the wireless connection. When the user ends the video sequence in the same way time information specifying the time of the end of the video sequence can be transmitted from the video unit to the microphone unit and thus the end of the part to be transmitted of the stored audio signal can be established. The stored audio time signals are also transmitted with the audio signal.

As soon as the video unit has received the audio/time stamp signal for a given video sequence the video unit assigns the received audio signal correctly in respect of time to the video signal on the basis of the audio and the video time stamps and on the basis of stored system clock alignment results, possibly carries out the above-described time re-scaling of the audio signal to align differences in speed of the system clocks and stores the combination of the video signal and the audio signal processed in that way in the memory 150 of the video unit.

If the wireless connection is not available at the time of the video recording then the video unit (without user intervention) repeats the requests for missing parts of the audio/time stamp signal as soon as data can be transmitted again by way of the connection and then subsequently carries out the described procedure for bringing audio and video sequences together correctly in respect of time. At the latest if the user of the video unit takes possession of the microphone unit 200 after the end of the event and in so doing the microphone unit 200 and the video unit 100 are in immediate proximity with each other a data transfer can take place and the missing audio data relating to the video sequences produced during the event can be transmitted to the video unit. Without further intervention on the part of the user he will therefore then find on his video unit audio-video sequences in which the audio signals recorded with the microphone unit 200 are stored in correct time relationship with the video sequences produced during the event.

Alternative Possible Uses:

The described method of recording and synchronizing audio and video signals can be used in the same manner for recording and synchronizing other signal configurations which are detected in relation to time. For example the time alignment of two system clocks as described with reference to FIGS. 7 through 9 can also be used for the synchronization of two video signals. That can be useful for example if video recordings are produced from the same event by two or more smartphones. Upon later processing of the recorded video signals the user would like to cut a video together from the recordings made by the two cameras, in which case he can switch at the correct time from the recording of one camera to a recording of the other camera. In this case also there is the problem that wireless alignment of the system clocks of the two smartphones may suffer from an unknown delay so that the above-described method of equalizing the two system clocks can produce an improved alignment result.

The method in still broader terms can also be applied to completely different signal configurations in relation to time like for example the speed of a vehicle or a temperature pattern in a chemical reaction. The microphone 230 or the camera 130 can then be generally viewed as a signal detection sensor and the detected signal is stored in a respective recording device together with time stamps.

The method according to the invention can be used whenever signal configurations on two separate recording devices are respectively detected with a dedicated time base and stored, which are later to be brought together in the correct time relationship, and wherein a wireless communication between the two recording devices may suffer from an unknown delay.

The invention claimed is:

1. A microphone unit comprising
a microphone for recording audio signals,
a transmitter/receiver for wireless bidirectional communication with a video unit which has a first system clock with a first time base,
a second system clock with a second time base, and
a memory for digital storage of an audio signal recorded with the microphone and time synchronization information;
wherein the microphone unit is adapted to repeatedly store in the memory jointly with an audio signal recorded by the microphone audio time stamps which specify the respective times of recording of the audio signal measured with the second system clock;
wherein the transmitter/receiver is adapted to communicate with the video unit by way of a data transfer protocol which is provided for a coordinated use of a used transmission channel by a plurality of transmitting and receiving devices and which has measures for time coordination of the access of different devices to the transmission channel so that variable waiting times can occur for access to the transmission channel;
wherein the microphone unit is adapted by way of the transmitter/receiver to carry out an alignment between the first system clock and the second system clock, wherein the alignment result includes a time value of the first system clock and an associated time value of the second system clock; and
wherein the alignment is effected by the video unit or the microphone unit as the initiating unit firstly reading out a current transmission time value ($t_{a,send}$) from its system clock and temporarily storing it and immediately initiating a first transfer process (PI) to the other of the two units, and wherein the respective other unit after conclusion of the first transfer process (PI) immediately reads out a current synchronization time value ($t_B$) from its system clock and transmits said synchronization time value ($t_B$) in a second transfer process (PO) to the initiating unit, and wherein the initiating unit upon reception of the second transfer (PO) immediately reads a current reception time value ($t_{A,receive}$) from its system clock and from the transmission time value ($t_{A,send}$) and the reception time value ($T_{A,receive}$) calculates a time value belonging to the synchronization time value ($t_B$).

2. An audio/video recording and synchronization system comprising the microphone unit as set forth in claim 1 and a video unit, wherein the video unit comprises
a camera unit for recording video signals,
a transmitter/receiver for wireless bidirectional communication with the microphone unit,
a first system clock with a first time base, and
a memory for digital storage of a video signal recorded with the camera unit and time synchronization information;
wherein the video unit is adapted to repeatedly store in the memory together with a video signal recorded by the camera unit video time stamps which specify the respective times of recording of the video signal measured with the first system clock; and
wherein the video unit is adapted by way of the transmitter/receiver to carry out an alignment between the first system clock and the second system clock.

3. A method of recording and synchronizing audio and video signals comprising the steps:
recording a video signal by means of a video unit and storing the video signal together with video time stamps which specify the respective times of recording of the video signal measured with a first system clock;
recording an audio signal by means of a microphone unit and storing the audio signal together with audio time stamps which specify the respective times of recording of the audio signal measured with a second system clock;
carrying out an alignment between the first system clock and the second system clock, wherein the alignment result contains a time value of the first system clock and an associated time value of the second system clock; and
bringing together the audio signal and the video signal, wherein time synchronization is effected on the basis of the video time stamps, the audio time stamps and the alignment result;
wherein the alignment between the first system clock and the second system clock is effected by way of a bidirectional wireless connection between the video unit and the microphone unit;
wherein a data transfer protocol is used, which is provided for a coordinated use of a used transmission channel by a plurality of transmitting and receiving devices and which has measures for time coordination of the access of different devices to the transmission channel so that variable waiting times can occur for access to the transmission channel; and
wherein the alignment is effected by the video unit or the microphone unit as the initiating unit firstly reading out a current transmission time value ($t_{a,send}$) from its system clock and temporarily storing it and immediately initiating a first transfer process (PI) to the other of the two units, and wherein the respective other unit after conclusion of the first transfer process (PI) immediately reads out a current synchronization time value ($t_B$) from its system clock and transfers said synchronization time value ($t_B$) in a second transfer process (PO) to the initiating unit, and wherein the initiating unit upon reception of the second transfer (PO) immediately reads a current reception time value ($t_{A,receive}$) from its system clock and from the transmission time value ($t_{A,send}$) and the reception time value ($T_{A,receive}$) calculates a time value belonging to the synchronization time value ($t_B$).

4. A method of recording and synchronizing a plurality of signal configurations in relation to time, comprising the steps:

recording a first signal configuration by means of a first recording device and storing the first signal configuration together with first time stamps which specify the respective times of recording of the first signal measured with a first system clock contained in the first recording device;

recording a second signal configuration by means of a second recording device and storing the second signal configuration together with second time stamps which specify the respective times of recording of the second signal measured with a second system clock contained in the second recording device;

carrying out an alignment between the first system clock and the second system clock, wherein the alignment result includes a time value of the first system clock and an associated time value of the second system clock;

wherein the alignment between the first system clock and the second system clock is effected by way of a bidirectional wireless connection between the first recording device and the second recording device;

wherein a data transfer protocol is used, which is provided for a coordinated use of a used transmission channel by a plurality of transmitting and receiving devices and which has measures for time coordination of the access of different devices to the transmission channel so that variable waiting times can occur for access to the transmission channel; and wherein the alignment is effected by the first recording device or the second recording device as the initiating unit firstly reading out a current transmission time value ($t_{a,send}$) from its system clock and temporarily storing it and immediately initiating a first transfer process (PI) to the other of the two units, and wherein the second recording device after conclusion of the first transfer process (PI) immediately reads out a current synchronization time value ($t_B$) from the second system clock and transfers said synchronization time value ($t_B$) in a second transfer process (PO) to the first recording device, and wherein the first recording device upon reception of the second transfer (PO) immediately reads out a current reception time value ($t_{A,receive}$) from the first system clock and from the transmission time value ($t_{A,send}$) and the reception time value ($T_{A,receive}$) calculates a time value belonging to the synchronization time value ($t_B$).

5. The method of recording and synchronizing a plurality of signal configurations in relation to time as set forth in claim 4, additionally comprising the step:

bringing together the first signal configuration and the second signal configuration, wherein time synchronization is effected on the basis of the first time stamps, the second time stamps and the alignment result.

6. A recording device for recording a signal configuration in relation to time, comprising a signal recording sensor for recording a signal, a first system clock with a first time base, a memory for digital storage of a signal configuration recorded with the signal recording sensor in relation to time and time synchronization information, and a transmitter/receiver for wireless bidirectional communication with a second recording device which has a second system clock with a second time base;

wherein the recording device is adapted to repeatedly store in the memory jointly with a signal configuration recorded by the signal recording sensor time stamps which specify the respective times of recording of the signal measured with the first system clock;

wherein the transmitter/receiver is adapted to communicate with the second recording device by way of a data transfer protocol which is provided for a coordinated use of a used transmission channel by a plurality of transmitting and receiving devices and which has measures for time coordination of the access of different devices to the transmission channel so that variable waiting times can occur for access to the transmission channel;

wherein the recording device is adapted by way of the transmitter/receiver to carry out an alignment between the first system clock and the second system clock, wherein the alignment result includes a time value of the first system clock and an associated time value of the second system clock; and wherein the alignment is effected by the recording device or the second recording device as the initiating unit firstly reading out a current transmission time value ($t_{a,send}$) from its system clock and temporarily storing it and immediately initiating a first transfer process (PI) to the other of the two recording devices, and wherein the respective other recording device after conclusion of the first transfer process (PI) immediately reads out a current synchronization time value ($t_B$) from its system clock and transmits said synchronization time value ($t_B$) in a second transfer process (PO) to the initiating recording device, and wherein the initiating recording device upon reception of the second transfer (PO) immediately reads out a current reception time value ($t_{A,receive}$) from its system clock and from the transmission time value ($t_{A,send}$) and the reception time value ($T_{A,receive}$) calculates a time value belonging to the synchronization time value ($t_B$).

\* \* \* \* \*